No. 896,818.

PATENTED AUG. 25, 1908.

E. V. GANDIL.
MILKING MACHINE.
APPLICATION FILED MAY 7, 1907.

2 SHEETS—SHEET 1.

Witnesses
Edwin L. Yewell
Edwin F. Frey

Inventor
Ernst Valdemar Gandil,
by W. E. Schoenborn.
attorney.

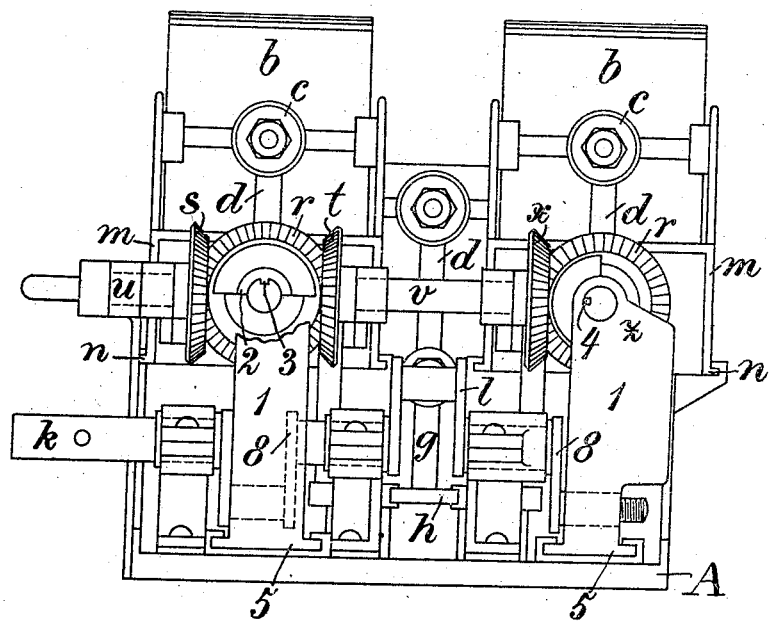
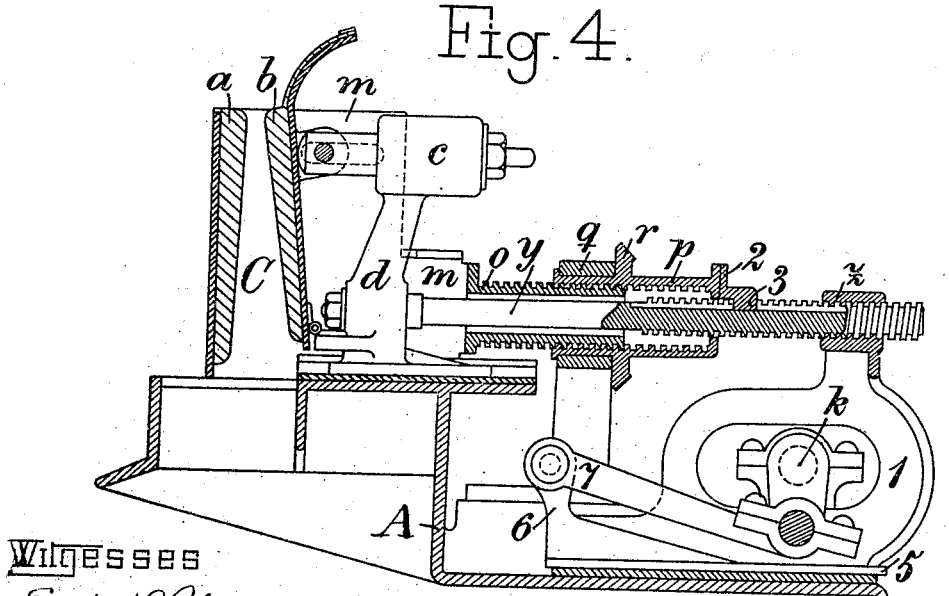

UNITED STATES PATENT OFFICE.

ERNST VALDEMAR GANDIL, OF COPENHAGEN, DENMARK.

MILKING-MACHINE.

No. 896,818.          Specification of Letters Patent.          Patented Aug. 25, 1908.

Application filed May 7, 1907. Serial No. 372,430.

*To all whom it may concern:*

Be it known that I, ERNST VALDEMAR GANDIL, a subject of the King of Denmark, residing at Copenhagen, in the Kingdom of Denmark, have invented certain new and useful Improvements in Milking-Machines, for which application has been made in Denmark, dated February 26, 1907, No. 326/07; Norway, March 15, 1907, No. 21,586; Sweden, March 15, 1907, No. 670/07; Germany, March 22, 1907, No. G. 24,625 III/45g.; Austria, March 23, 1907; Hungary, April 7, 1907, No. 5,258; France, April 8, 1907, No. 4,347; Belgium, April 3, 1907, No. 160,506; Switzerland, April 11, 1907, No. 45,082; Italy, April 17, 1907, No. 201/154; Finland, April 11, 1907.

The present invention relates to improvements in milking machines of the kind set forth in my previous patent No. 805281, in which the milking devices consist of a fixed pad and a movable pad actuated by a spring-casing carried on a slide, the upper end of the latter pad being pressed against the root of the teat, and subsequently during the further forward movement of the slide executes a swinging movement, the lower part of the pad being pressed against the teat while the spring-casing above is squeezed together.

The present invention consists in the arrangement whereby the milking devices may be brought nearer or further from each other in such a manner that they may be adjusted according to the distance between the teats in the longitudinal direction of the cow, without the distance between the milking-devices fixed and movable pads, which are previously adjusted to the diameter of the teats, being changed during this adjustment, that is to say: the fixed and movable pads move together during the adjustment. The rear milking device is stationary on the frame, while the front milking devices are movable.

A form of construction of the milking-machine according to the present invention is shown in the accompanying drawings, in which:—

Figure 1:
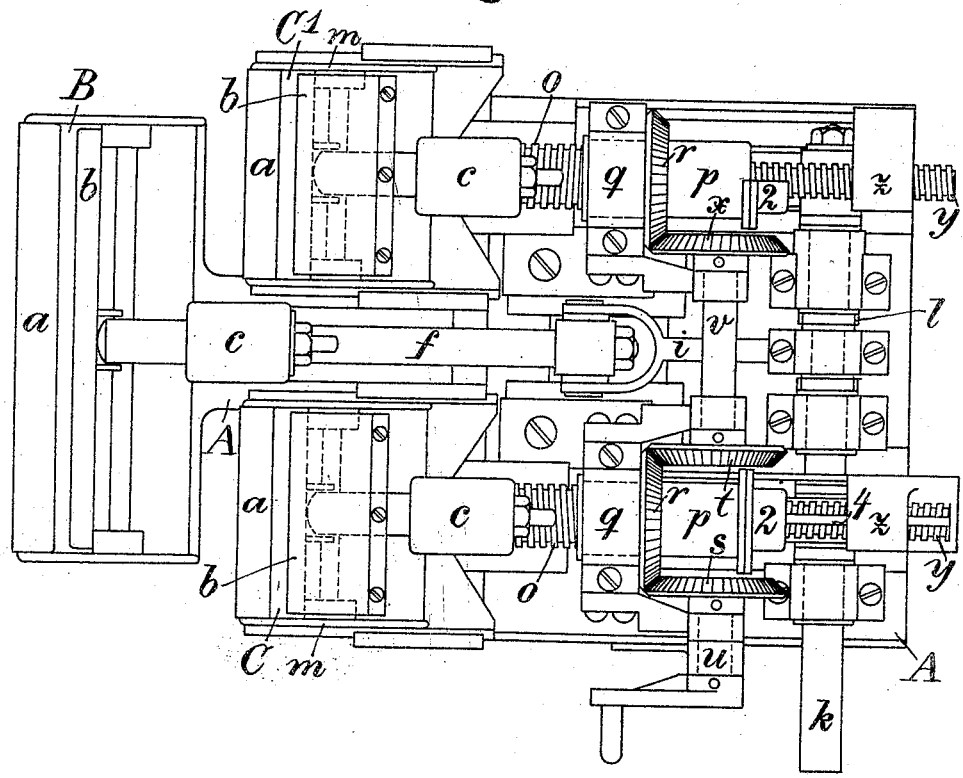
Figure 3:
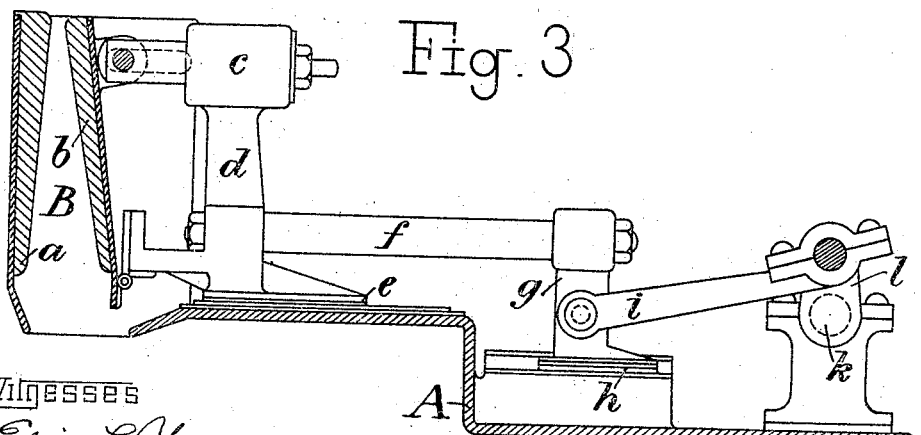

Figure 1 is a plan view of the machine. Fig. 2 is a side view with some of the parts removed, among those are all the connecting-rods. Fig. 3 shows a partial section of the operating mechanism of the rear portion of the milking device. Fig. 4 shows the operating mechanism of one of the front milking devices with the part of the adjusting mechanism, partly in section likewise.

The machine consists of a fixed frame A, a rear milking device B, operating the rear pair of teats of the cow, two front milking devices C and C', and the necessary adjusting and moving mechanisms.

Each milking device consists of a fixed pad $a$ and a movable pad $b$ which latter is at the top in connection with the spring-casing $c$ and at the bottom with an upright $d$ guided by a slide.

The upright $d$ of the movable pad on the rear milking device B is situated on a slide $e$ (Fig. 3) which is guided in slots in the bottom of the frame A. The upright $d$ is by means of a rod $f$ connected with another upright $g$ situated on a slide $h$ and likewise guided in slots. A connecting-rod $i$ is movably attached to the upright $g$ by means of a forked rod, while the other end of the connecting-rod is movably connected with crank $l$ situated on the middle of the driving-shaft $k$. By rotating the driving-shaft $k$ supported by bearings in the frame, a backward and forward motion in relation to the fixed pad $a$ will be imparted to the movable pad $b$.

The two front milking devices C and C' are similarly constructed and arranged symmetrically round the machine's longitudinal axis.

The fixed pads $a$ form the rear side of frames $m$ (Fig. 4), the sides of which are provided with turned down flanges $n$ at the bottom (Fig. 2) which are guided in slots in the machine frame A. The frames $m$ are at the rear in firm connection with a hollow cylinder $o$ having on the outside a screw-thread the nut of which is formed by another hollow cylinder $p$ having an interior screw-thread, this latter cylinder is rotatable but is prevented from moving in a longitudinal direction by its bearing $q$ which is in fixed connection with the machine's frame A. The cylinder $p$ is connected with or is provided with a bevel wheel $r$ into which engage two other bevel wheels $s$ and $t$ (Figs. 1 and 2). The outside wheel is fixed on a shaft $u$ with bearing in the side of the frame A, while the interior wheel $t$ is fixed on a shaft $v$ having its bearings in the middle of the frame A, the other end of shaft $v$ is provided with a bevel wheel $x$ which engages with another wheel $r$ which together with the first mentioned wheel $r$ is fixed symmetrically round the longitudinal axis of the machine. When now the two screws $o$ have opposite cut screw-threads for example, as shown in the drawing Fig. 1, in which the lower screw is a right-handed screw and the upper a left handed screw and having the same pitch, by turning the shaft $u$ the fixed pads $a$ on the front milking devices will be moved equal distances backwards or forwards.

The uprights $d$, of the movable pads $b$ on the front milking devices which are likewise guided by slides in slots, are each at the bottom provided with a rotatable rod $y$ (Fig. 4) which in the foremost end is provided with a screw-thread and passes through the hollow cylinders $o$ and $p$. The threaded part of the rod $y$, the threads of which work in opposite direction of the threads on the screw $o$ through the cavity of which the rod $y$ is passed and which has the same pitch as these, has its nut $z$ in an upright 1. To the cylinder $p$ is fastened a mounting 2, which with the projection 3 catches in a longitudinal groove 4 in the screw $y$ thereby causing the screw $y$ to revolve with the cylinder $p$. When the shaft $u$ is turned, the fixed pads $a$ will, as already stated, be moved backwards and forwards, and through the construction just described, the movable pads will at the same time be moved backwards and forwards likewise, and the screws $o$ and $y$ having the same pitch, the pads $b$ will just be carried the same distance backwards and forwards as are the pads $a$.

By turning the shaft $u$ it is therefore possible to move the front milking devices C and C' backwards or forwards in relation to the milking device B until the distance between them is equal to the distance between the cow's foremost and hindmost pair of teats, and during this adjustment the distance between the fixed and movable pads in the same milking device, does not change.

The uprights 1, which at the top form the nuts $z$ for the screws $y$ are situated on slides 5 (Fig. 4) which are guided in slots in the frame A. The slides 5 are at the rear provided with bearings 6 supporting movable connecting-rods 7, the other ends of which are in movable connection with cranks 8 which like the crank $l$ intended for the rear milking device, are placed on the driving shaft $k$. The two cranks 8 are spaced diametrically opposite to the crank $l$ on the shaft. When, therefore, the driving shaft $k$ is turned the movable pads of the rear and front milking devices will, alternately, be carried backwards and forwards in relation to the fixed pads.

I declare that what I claim is:—

1. In a milking machine, a frame, a plurality of milking devices mounted on said frame, means for adjusting the relative positions of the front and rear milking devices, said means comprising a screw threaded member connected to each of the front milking devices and a second screw threaded member engaging each of these members, and actuating means adapted to rotate said second members and thereby effect the adjustment, substantially as described.

2. In a milking machine, a frame, a plurality of milking devices mounted on said frame, an externally screw-threaded member connected to each of the front milking devices, an internally screw threaded member engaging each of the first mentioned members, a bevel gear rigidly connected to each of said internally threaded members, gearing engaging with said bevel gears, and an operating device for actuating said gearing substantially as described.

3. In a milking machine, a frame, milking devices adjustable on said frame, each of said devices comprising a movable pad, rotary means for adjusting the positions of said milking devices, screw threaded members connected so as to move axially with said movable pads and to rotate with said rotary adjusting means, and operating means for causing the reciprocation of said movable pads, said means comprising screw threaded parts engaging the previously mentioned screw threaded members substantially as described.

In witness whereof, I have hereunto signed my name this 22nd day of April 1907, in the presence of two subscribing witnesses.

ERNST VALDEMAR GANDIL.

Witnesses:
 VIGGO BLOM,
 CECIL VILHELM SCHON.